(12) United States Patent
Miceli et al.

(10) Patent No.: US 10,832,175 B1
(45) Date of Patent: *Nov. 10, 2020

(54) METHOD OF SELF-CONTAINED RECYCLING OF PHARMACEUTICAL CONTAINERS

(71) Applicant: Altium Healthcare Inc., Atlanta, GA (US)

(72) Inventors: David A. Miceli, Reno, NV (US); Joseph A. Miceli, Spencer, TN (US)

(73) Assignee: Altium Healthcare Inc., Atlanta, GA (US)

( * ) Notice: Subject to any disclaimer, the term of this patent is extended or adjusted under 35 U.S.C. 154(b) by 412 days.

This patent is subject to a terminal disclaimer.

(21) Appl. No.: 15/784,670

(22) Filed: Oct. 16, 2017

Related U.S. Application Data

(63) Continuation of application No. 12/870,492, filed on Aug. 27, 2010, now Pat. No. 9,811,782.

(51) Int. Cl.
*G06Q 10/00* (2012.01)

(52) U.S. Cl.
CPC .................................. *G06Q 10/00* (2013.01)

(58) Field of Classification Search
CPC ....................................................... G06Q 10/00
See application file for complete search history.

Primary Examiner — Aryan E Weisenfeld
(74) Attorney, Agent, or Firm — Luedeka Neely Group, P.C.

(57) ABSTRACT

Disclosed herein is a system and method of recycling of a pharmaceutical container system, which can include the container and closure for the container. The disclosure teaches a self-contained recycling system wherein the pharmaceutical containers that are made for consumer use are returned for processing and remanufacturing as new unused pharmaceutical containers to facilitate the ease of recycling of the same and the future use as unused pharmaceutical containers and viable consumer products.

13 Claims, 4 Drawing Sheets

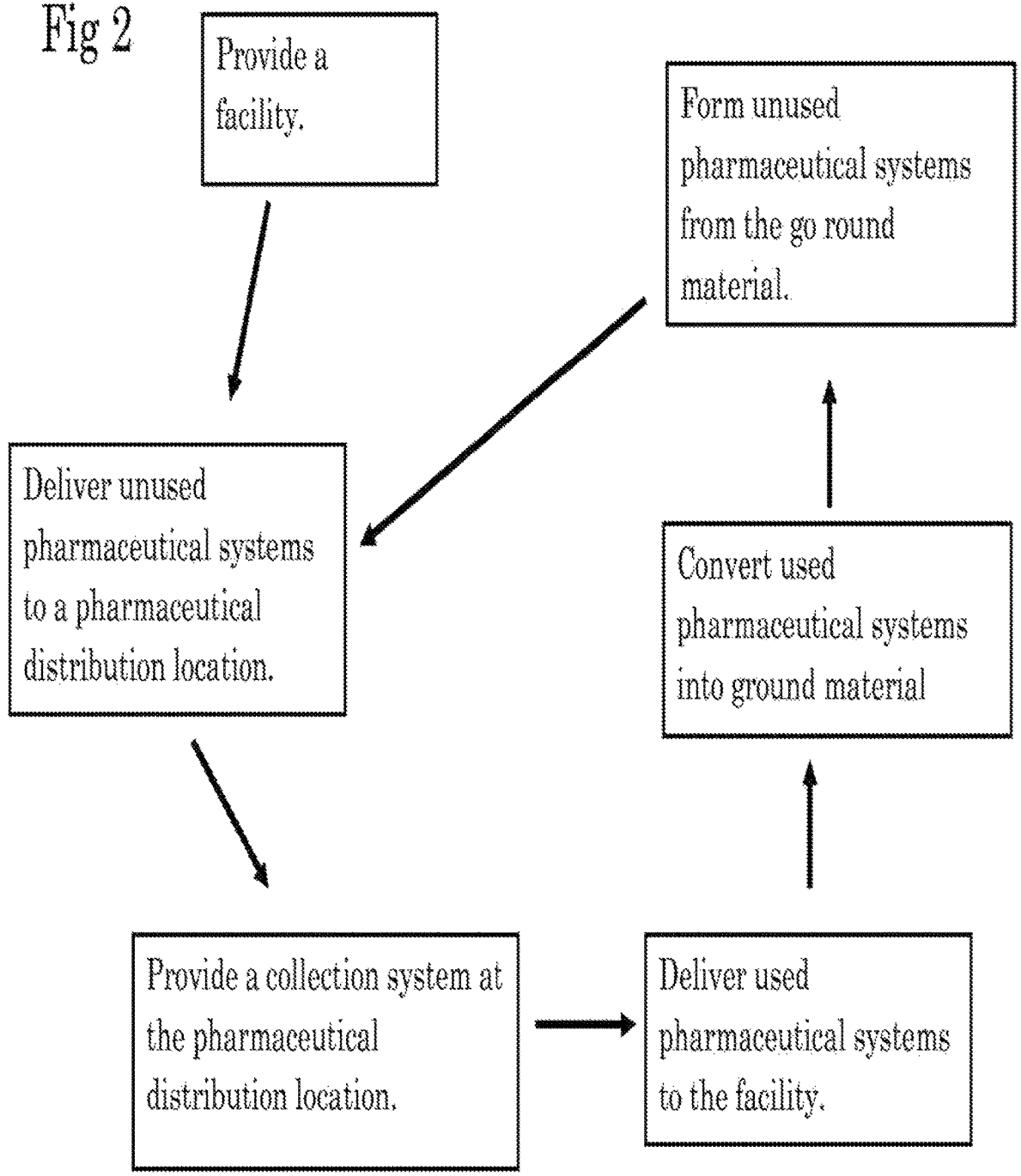

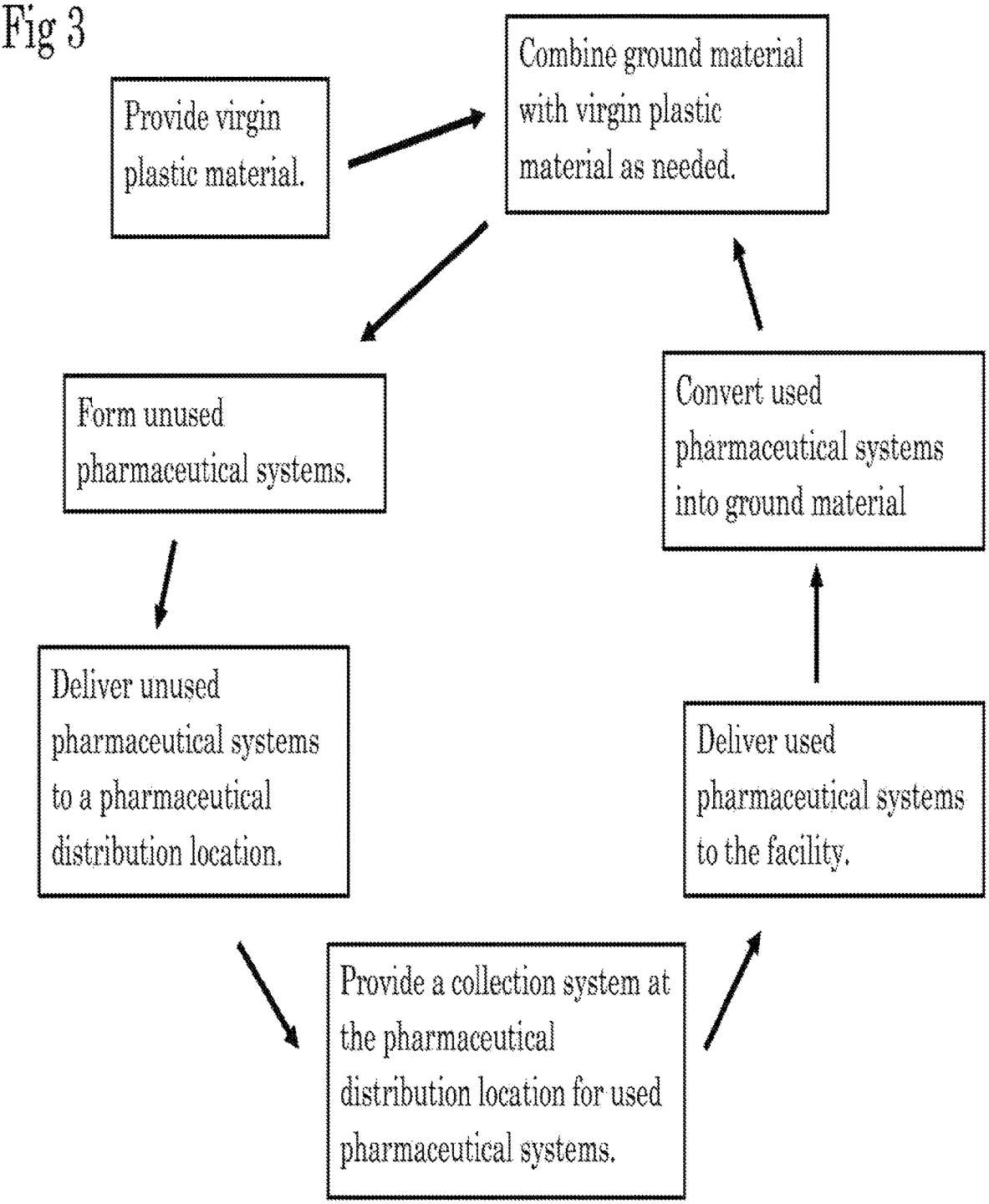

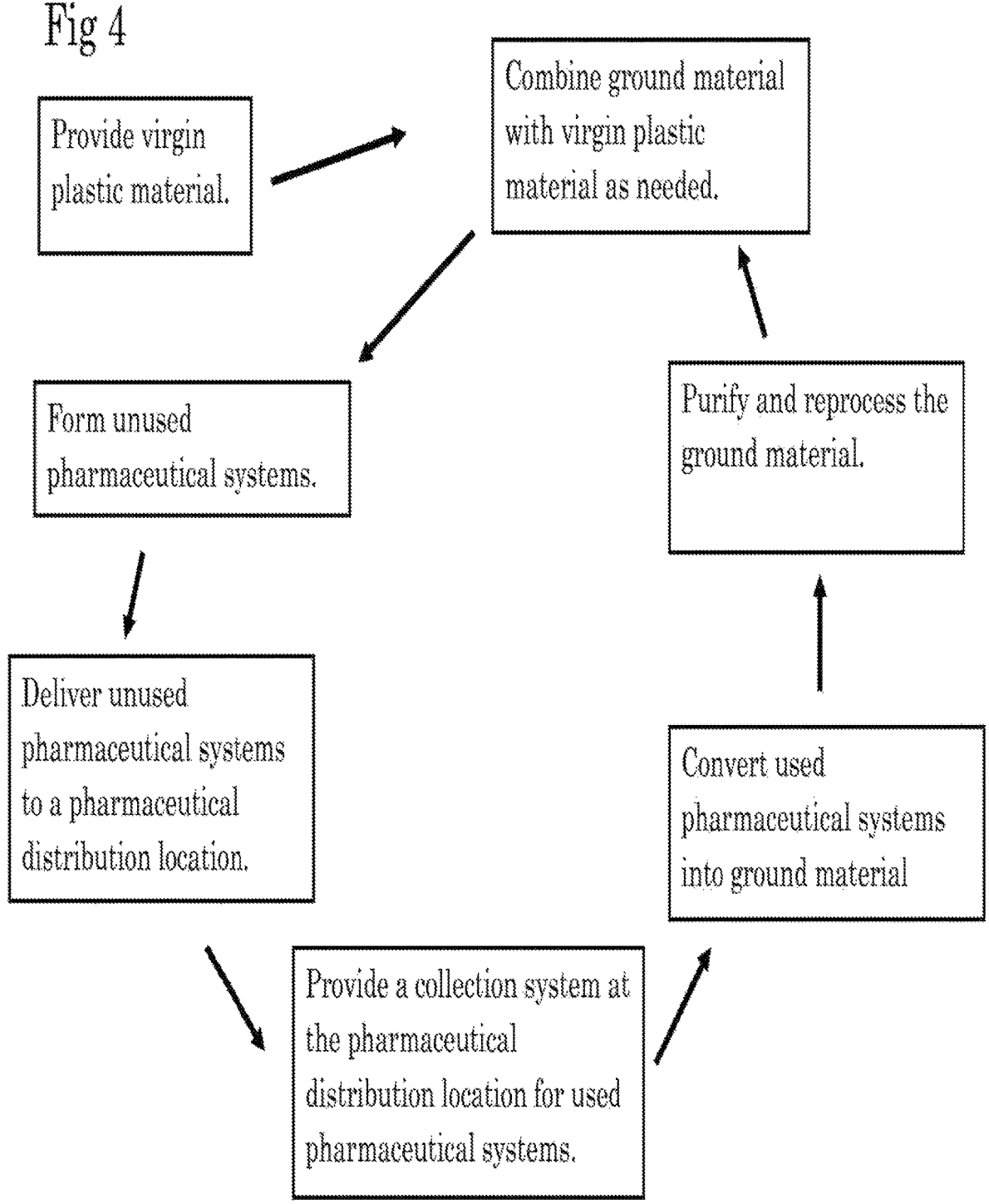

METHOD OF SELF-CONTAINED RECYCLING OF PHARMACEUTICAL CONTAINERS

CROSS-REFERENCE TO RELATED APPLICATION

This application is a continuation of co-pending U.S. application Ser. No. 12/870,492 filed Aug. 27, 2010, entitled "Method of Self-Contained Recycling of Pharmaceutical Containers," the contents of which being incorporated by reference herein in its entirety.

BACKGROUND OF THE INVENTION

The present invention relates generally to recycling. More particularly the present invention relates to a system and method of substantially closed looped recycling pharmaceutical containers and caps that are part of a pharmaceutical system.

The pharmaceutical prescription industry is a multi-billion dollar industry that is facilitated by multiple industries. Obviously, the specific pharmaceutical manufacturing companies supply the pharmaceuticals to various distribution points or centers, including pharmacies, mail order companies, internet companies, and the like. The pharmaceuticals are then packaged in pharmaceutical containers for supply or delivery to the ultimate consumer the patient. As the industry has grown over the years there are literally millions of pharmaceutical container systems, including generally the container and cap used to seal the container, that are supplied on a monthly basis.

This supply in light of the continuously dwindling natural resources as well as the desire to recycle, reuse and reduce the use of those natural resources has led to recycling of the pharmaceutical container systems. This recycling is in its infancy due to recycling issues associated with pharmaceutical containers and various regulatory hurdles that deal with patient information and the remnant elements of the pharmaceuticals within those containers.

Heretofore, the recycling of pharmaceutical containers has been rudimentary, at best, relying on the conventional recycling processes wherein general plastic containers, as opposed to specifically pharmaceutical containers, are collected by an individual or at a location after use. Those general plastic containers are then returned to a processing facility as a collection of various grades, and sometime various families, of plastic. Under this conventional collection process, the plastic is typically collected, maintained, and returned in a commingled form wherein various types and grades of plastics are commingled within the same return shipment.

This commingled recycling can further complicate the potential contamination issues and reduce the future use of certain preformed plastic grades. This is because at the recycling facility various grades of plastic containers within the same plastic family are typically combined and recycled without true regard to the various end products that will be produced from that plastic or the end users of that recycled plastic material. More typically, however, various recycling facilities will only take a single grade or one of a couple grades of plastic material within a given family. These grades or material are then recycled and processed into a varying array of consumer goods without consideration of the various aspects or characteristics of the original plastic that is recycled.

Within each plastic resin family there are various grades and types of resins that comprise that family. Various types of those resins are used for varying applications. For example, some types can be used for film applications, some for extrusion molding, some for thermal forming and still others for injection molding. Each type of resin within a family will have different performance characteristics and physical properties that affect how that resin reacts and performs. An addition to these characteristics and physical properties, there can be various additives, clarifiers, nucleators, and other grade and application specific formulas that are added into a resin to facilitate that resin's use for a particular application within a particular grade and for a particular resin family.

The common resin families include high density polyethylene (HDPE), polypropylene (PP) and polyethylene terephthalate (PET). Typically, a current recycling systems lump various grades of a family of plastic resin together for recycling purposes. As such, conventionally within a particular family the same grade of plastic is recycled together regardless of its additional additives and other items that were specifically added to various subsets of that grade for the specific formulas. Thus, this creates a problem when trying to use recycled plastics for specific applications.

For example, recycled HDPE plastic from milk jugs, shampoo bottles, or detergent containers, while they may be in the same class and resin family, are not generally viable materials used to make HDPE bottles for packaging pharmaceuticals. The HDPE resin as modified to form the milk jugs, shampoo bottles, or detergent containers has different characteristics and additives, or usually lacks the same of additives, as the type and grade of HDPE used for pharmaceutical containers. As such, the "common household" HDPE recycling containers cannot be processed and controlled properly during the recycling process such that the resulting flake of pellets can be directly used to make pharmaceutical containers. Further, the process used to make pharmaceutical containers is different from the extrusion, thermal forming, injecting, or film applications and production methods for other common household plastic products within the HDPE family and classification. This is also true for materials in the PP and PET resin families.

Additionally, pharmaceutical containers require specific grades of plastic and specific additives to those grades of plastic in order to pass Federal Drug Administrative (FDA) approval. Without these additives and additions, the pharmaceutical containers are not certified for use as pharmaceutical containers. As such, the pharmaceutical container industry typically requires additional processing of the containers not normally required for a standard drink bottle or similar grade plastic item. These additional characteristics are not conventionally considered to recycling. As such, the typical recycling facility does not lend itself to the recycling of pharmaceutical containers due to their additional complication and requirements for manufacturing and production into a consumer usable product.

As such, specifically in the recycling process of pharmaceutical systems including containers and caps, there is a shortcoming that leads to inadequate processing of the used pharmaceutical container systems into new pharmaceutical container systems adequate for consumer use.

What is needed then is a system and method of recycling pharmaceutical container systems to increase the likelihood of recycling of those containers and caps and ease the actual recycling of the same into new unused pharmaceutical containers and caps. This needed system and method is lacking in the art.

BRIEF SUMMARY OF THE INVENTION

Disclosed herein is a system and method of recycling of a pharmaceutical container system, which can include the container and closure for the container. The disclosure teaches a self-contained recycling system wherein the pharmaceutical containers that are made for consumer use are returned for processing and remanufacturing as new unused pharmaceutical containers to facilitate the ease of recycling of the same and the future use as unused pharmaceutical containers and viable consumer products.

A method of recycling the pharmaceutical containers includes providing a facility for the distribution of unused pharmaceutical containers and acceptance of used pharmaceutical containers. The method further includes delivering unused pharmaceutical containers from the facility to a pharmaceutical distribution location, such as a pharmacy, using a first delivery system and providing a collection system for collecting used pharmaceutical containers at the pharmacy. The method also includes delivering the used pharmaceutical containers collected from the pharmacy to the facility using a second delivery system. Additionally, the method includes converting unused pharmaceutical containers at the facility into ground material and forming unused pharmaceutical containers from the ground material.

The method could further include providing the material that comprises the ground material and the pharmaceutical containers and maintaining that material between the ground material and the pharmaceutical containers for all of the used pharmaceutical containers collected at the pharmacy. This ground material includes a material grade sufficient for pharmaceutical containers and when forming unused pharmaceutical containers from the ground material, the method teaches the addition of only matter that includes material grades sufficient for pharmaceutical containers.

A method of recycling pharmaceutical container system made of resin by manufacturers is also taught. This method comprises providing unused pharmaceutical container systems and delivering those unused pharmaceutical container systems to a pharmaceutical distribution location, such as a pharmacy, using a delivery system. Next, a collection device is provided for collecting used pharmaceutical container systems at the pharmacy and the used pharmaceutical container systems are delivered from the pharmacy to the manufacturer using the same delivery system. Next, the used pharmaceutical containers are recycled directly into unused pharmaceutical container systems.

Also included is a method of recycling pharmaceutical containers comprising supplying unused pharmaceutical containers formed from plastic resin and delivering the unused pharmaceutical containers. The method includes providing a collection system for collecting used pharmaceutical containers and receiving the collected used pharmaceutical containers. In addition, the method includes recycling the used pharmaceutical containers into unused pharmaceutical containers by converting all of the collected used pharmaceutical containers into ground material and forming the unused pharmaceutical containers from the ground material. The method can further include maintaining the material comprising the ground material and the pharmaceutical containers in a product cycle between the ground material and the pharmaceutical containers once the material is in plastic resin form.

It is therefore a general object of the present disclosure to provide a method and system of recycling pharmaceutical containers.

Another object of the present disclosure is to provide a method and system of recycling pharmaceutical containers that maintains returned used pharmaceutical containers in a cycling system between ground material and pharmaceutical containers.

Still another object of the present disclosure is to provide a recycling method and system that separates pharmaceutical containers and maintains those containers in isolated recycling, production, and distribution systems between a used pharmaceutical container and an unused pharmaceutical container.

Yet another object of the present disclosure is to provide a method and system for controlled recycling of pharmaceutical containers.

Yet still another object of the present invention is to provide a method and system for recycling pharmaceutical containers that maintains the plastic resin used to form the pharmaceutical containers in a plastic grade and state from the initial formation of a pharmaceutical container through a recycling phase to subsequent formation of a pharmaceutical container isolated from other grades and plastic resins that will be used on non-pharmaceutical container products.

Other and further objects, features and advantages of the present disclosure will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 2 shows a flow chart of an alternate example of a methodology taught in accordance with the current disclosure.

FIG. 3 shows a flow chart of an alternate example of a methodology taught in accordance with the current disclosure.

FIG. 4 shows a flow chart of another example of a methodology taught in accordance with the current disclosure.

DETAILED DESCRIPTION OF THE INVENTION

Figure 1:
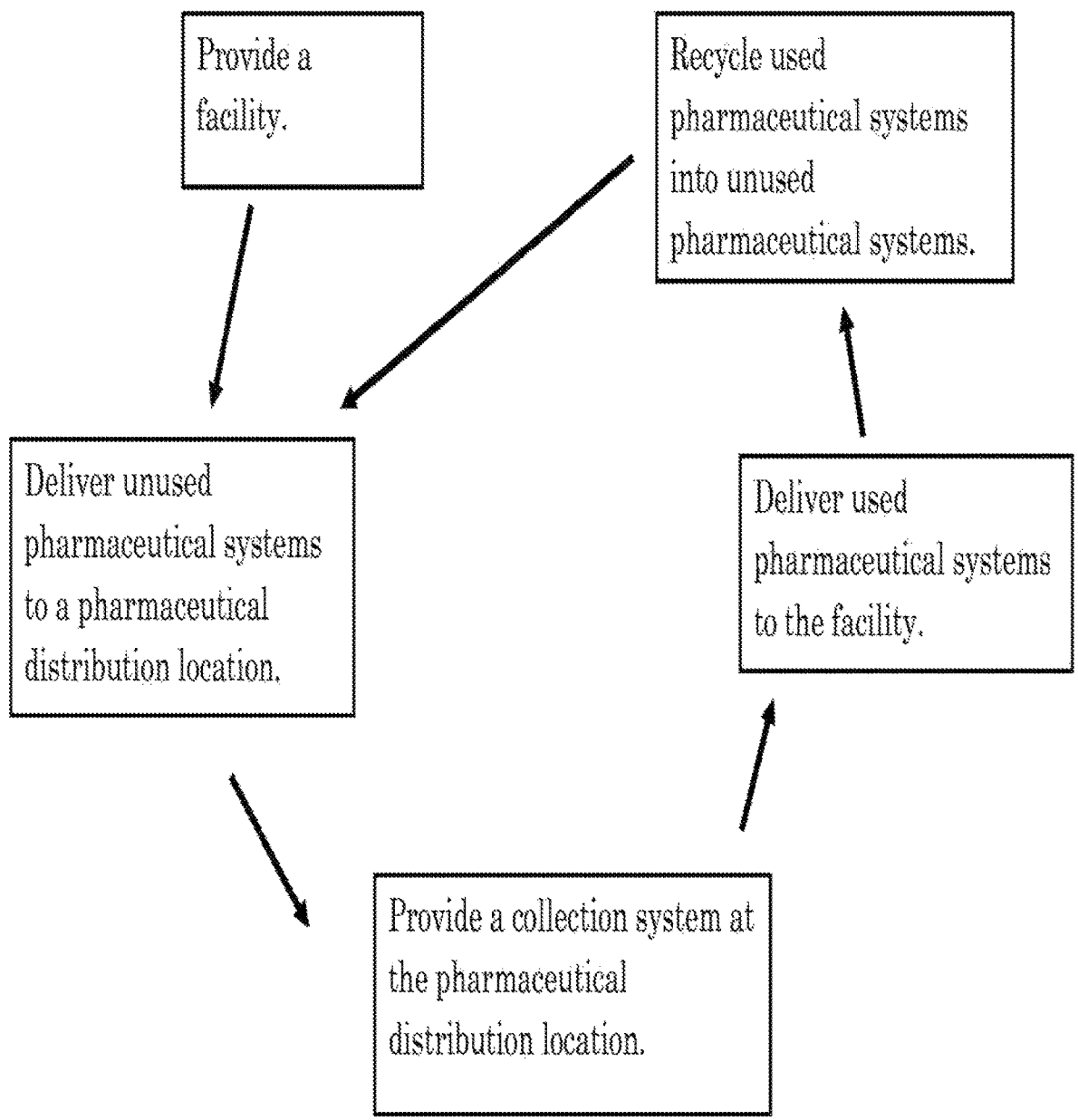
FIG. 1 shows a flow chart of an example of a methodology taught in accordance with the current disclosure.

Disclosed herein is a system and method of recycling pharmaceutical container systems. The system and method includes facilitating the return of pharmaceutical containers and closures for recycling and maintaining those pharmaceutical containers and closures in a recycling process isolated from other plastic recyclables in order to convert the used pharmaceutical containers and closures back into unused pharmaceutical containers.

A method of recycling pharmaceutical systems including containers and caps comprises providing a facility for the distribution of unused pharmaceutical containers and the acceptance of used pharmaceutical containers. The unused pharmaceutical containers can be several types. For example, the unused pharmaceutical containers can be those containers that will house the pharmaceuticals in bulk at the pharmaceutical dispensing location, which can be a pharmacy, mail order distribution facility, internet distribution facility or the like. Additionally, the unused pharmaceutical containers can be those pharmaceutical containers that will house the pharmaceuticals as they are provided to a patient for which the pharmaceutical within the container is prescribed.

Additionally, the method will include delivering the unused pharmaceutical containers from the facility to a pharmaceutical distribution location using a first delivery system. A first delivery system can include systems known in the art to physically transport materials including automobile, rail, airplane, and mail delivery systems. The method can further include providing a collection system for collecting the used pharmaceutical containers at the pharmaceutical distribution location. This collection system can include various areas and contain devices known in the art to hold the used pharmaceutical containers, including kiosk, bin, crates, and the like.

The method further includes delivering the used pharmaceutical containers collected from the pharmaceutical distribution location to the facility using a second delivery system. This second delivery system can include those various types of delivery systems mentioned before. This second delivery system can also be the same delivery system as the first delivery system. For example, the first and second delivery systems can be a delivery vehicle, such as a truck, train, airplane, and the like, that is used to deliver unused pharmaceutical containers to the pharmaceutical distribution location. As that delivery vehicle makes a delivery at one of the pharmaceutical distribution locations, it can pick up the used pharmaceutical containers and transport those used pharmaceutical containers back to the facility. This is further facilitated by the fact that a single delivery vehicle can start with an inventory of unused pharmaceutical containers in its holding area, such as a bay or a bed, and as those unused pharmaceutical containers are delivered, it can collect the used pharmaceutical containers. This facilitates a use of transportation and delivery modes such that the delivery vehicles are preferably not empty and are doing a continuous drop off and pick up process during its route as that delivery vehicle visits various pharmaceutical distribution locations.

The method further includes converting the used pharmaceutical containers at the facility into ground material and forming unused pharmaceutical containers from the ground material. The method includes maintaining any returned used pharmaceutical containers isolated from other recycled plastic such that the returned used pharmaceutical containers are directly recycled into unused pharmaceutical containers. The concept of directly recycled does include the addition of plastic resin that has been previously unused in the formation of any type of plastic item, which can be described as virgin plastic resin. This virgin plastic resin and the ground material from the unused pharmaceutical containers can be combined as needed on a volumetric basis to form new unused pharmaceutical containers.

In this recycling, ground material can be various forms of material that is produced from the cutting and/or grinding of containers into small particles. Typically, ground material can encompass the conversion of pharmaceutical containers into multiple recyclable forms including, but not limited to, flake material and pellet material, as known in the art. These flake and pellet materials can then be processed to form new pharmaceutical containers and a close cycle of recycling that draws directly from used pharmaceutical containers and processes those used pharmaceutical containers through the ground material, i.e. flakes or pellets, into new unused pharmaceutical containers.

The recycling portion of a method, which can include the converting of the used pharmaceutical containers into the ground material and forming unused pharmaceutical containers from that ground material, can also include selling the ground material to a third party wherein that third party forms unused pharmaceutical containers. This third party can preferably be in the pharmaceutical container forming business, can be described as a manufacturer of pharmaceutical containers.

During the recycling process as taught, this method can include the purifying and reprocessing of a ground material before forming unused pharmaceutical containers. This purifying and reprocessing preferably meets FDA guidelines, as applicable, in order to produce pharmaceutical containers that comply with FDA regulations, namely FDA regulations for resin used in direct, food and drug contact applications. Additionally, the containers made from that ground material must also meet United States Pharmacopeia (USP) regulations for containers used for the storage and dispensing of pharmaceutical products.

In this method, a single manufacturer can provide the unused pharmaceutical containers to facilitate the delivery of those containers and assist with the collection of the used pharmaceutical containers. This manufacturer can also convert the used pharmaceutical containers into ground material and form unused pharmaceutical containers therefrom. A third party, such as a plastics refinery and the like, can purify and reprocess the ground material before it is formed into pharmaceutical containers by the manufacturer. Alternately, the manufacturer can use a third party to deliver and collect and return the pharmaceutical containers between the pharmaceutical delivery location and the manufacturer for recycling and subsequent production as unused pharmaceutical containers.

Various forms of plastics can be used with this method, including high density polyethylene, polypropylene, polyethylene terephthalate and other similar plastic types used in the production of pharmaceutical containers.

In this method, the facility as provided by an entity, such as the manufacturer, can include a first location that is used for delivery of the unused pharmaceutical containers and a second location for the delivery of used pharmaceutical containers. In some instances, the first location and second location can be at the same building and/or location, namely a delivery area, delivery dock, loading dock, bay and the like.

In a preferred embodiment of this method, the material that comprises the ground material and the pharmaceutical containers is maintained between those states of matter such that the material is either in pharmaceutical container form or in ground material form. This is effective for the used pharmaceutical containers that are collected at the pharmaceutical distribution location such that those collected used pharmaceutical containers are returned, and recycled. Again, the recycling can be converting the used pharmaceutical containers first into ground material and then forming the ground material into unused pharmaceutical containers that will then be redistributed into the pharmaceutical industry and used to store, contain, and deliver pharmaceuticals.

In this usage, the term "matter" can include the plastic resin in its various forms that is used to directly create pharmaceutical containers. For example, this can be the virgin plastic resin having the characteristics that are conducive to forming that resin into pharmaceutical containers. This matter can also be maintained between the two states of used and unused pharmaceutical containers as these containers are shipped between the facility and the pharmaceutical delivery location.

Additionally, this method teaches maintaining the ground material in a substantially closed loop environment during the recycling process. For example, the method includes using ground material that has a material grade sufficient for pharmaceutical containers. This ground material can be supplemented by plastic resin, such as virgin resin, having a similar material grade that is sufficient for pharmaceutical containers. This ground material and virgin resin can be used to form the unused pharmaceutical containers such that the only matter that is included in the formation of these unused pharmaceutical containers is matter that includes material grade sufficient for that purpose. This can effectively eliminate the commingling of other plastic resin types, whether recycled or in virgin form, from the method taught herein. This method then becomes a substantially closed loop recycling method wherein all used pharmaceutical containers returned remain in a recycling and manufacturing process such that only new pharmaceutical containers will be formed therefrom.

The conversion of the used pharmaceutical containers into ground material can include the use of a grinding apparatus at the pharmaceutical shipping distribution location, such as a pharmacy. That grinding apparatus can convert the used pharmaceutical containers system containers into ground material before they are delivered back to the manufacturer, or third party processing facility.

This method teaches providing the resin that comprises the pharmaceutical containers systems and eventually the ground material and maintaining that resin between the used pharmaceutical container system and the unused pharmaceutical container system for all used pharmaceutical container systems collected. Effectively, again, this substantially closed cycle recycling method results in recycling of collected pharmaceutical container systems into new pharmaceutical container systems with preferably the only addition being the influx of new, and never before used, plastic resin into the recycling loop.

Additionally, the methods taught herein can include a collection system that incentivizes the collection of used pharmaceutical containers. For example, a manufacturer and/or resin processing company can subsidize or buy the used pharmaceutical containers from a pharmaceutical distribution center as those used pharmaceutical containers are returned by the patients that used them. These incentives can take many forms such as the purchasing of equipment to grind the containers into ground material to convert the containers into ground material, discounts on future orders, outright payment for the used pharmaceutical containers, and the like.

Thus, although there have been described particular embodiments of the present invention of a new and useful "Method of Self-Contained Recycling of Pharmaceutical Containers" it is not intended that such references be construed as limitations upon the scope of this invention except as set forth in the following claims.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method of recycling plastic storage containers comprising:
   (a) providing a facility for the distribution of unused plastic storage containers that comply with Federal Drug Administration (FDA) regulations for drug contact use in the storage and dispensing of drug products and the acceptance of used plastic storage containers that comply with FDA regulations for drug contact use, the unused plastic storage containers including unused recycled plastic storage containers made at least in part from the used plastic storage containers;
   (b) delivering unused plastic storage containers from the facility to one of a plurality of dispensing locations using a first delivery system;
   (c) providing a collection system for collecting only used plastic storage containers that comply with FDA regulations for drug contact use at the plurality of dispensing locations, the used plastic storage containers collected from the plurality of dispensing locations being isolated from other plastic recyclables in the collection system;
   (d) delivering the used plastic storage containers collected from the plurality of dispensing locations to the facility using a second delivery system;
   (e) converting at the facility the used plastic storage containers into unused recycled plastic storage containers; and
   (f) repeating steps (b)-(f) to provide a closed-loop recycling program wherein the used plastic storage containers collected from the plurality of dispensing locations are isolated from other plastic recyclables such that the used plastic storage containers are directly recycled into unused recycled plastic storage containers that comply with FDA regulations for drug contact use in the storage and dispensing of drug products.

2. The method of claim 1, wherein the used plastic storage containers and the unused plastic storage containers are composed of high density polyethylene.

3. The method of claim 1, wherein the used plastic storage containers and the unused plastic storage containers are composed of polypropylene.

4. The method of claim 1, wherein the used plastic storage and the unused plastic storage containers are composed of polyethylene terephthalate.

5. The method of claim 1, wherein the used plastic storage containers and the unused plastic storage containers are composed of material selected from the group containing high density polyethylene, polypropylene, and polyethylene terephthalate.

6. The method of claim 1, wherein the facility includes a first location used for the delivery of unused plastic storage containers and a second location for the delivery of used plastic storage containers.

7. The method of claim 1, wherein the first location and the second location at the facility are the same building.

8. The method of claim 1, wherein the first delivery system and the second delivery system are the same delivery system.

9. A method of recycling plastic storage container systems including a container and a closure, the method comprising:
   (a) collecting used plastic storage container systems that comply with Federal Drug Administration (FDA) regulations for drug contact applications at a plurality of dispensing locations;
   (b) delivering the used plastic storage container systems from the plurality of dispensing locations to a manufacturer;

(c) recycling the used plastic storage container systems into unused recycled plastic storage container systems; and (d) repeating steps (a)-(c) to provide a closed-loop recycling program wherein the used plastic storage container systems collected from the plurality of dispensing locations are isolated from other plastic recyclables such that the used plastic storage container systems are directly recycled into unused recycled plastic storage container systems that comply with FDA regulations for drug contact applications.

10. The method of claim 9, wherein the containers of the used plastic storage container systems and the unused plastic storage container systems are composed of high density polyethylene.

11. The method of claim 9, wherein the containers of the used plastic storage container systems and the unused plastic storage container systems are composed of polypropylene.

12. The method of claim 9, wherein the containers of the used plastic storage container systems and the unused plastic storage container systems are composed of polyethylene terephthalate.

13. The method of claim 9, wherein the used plastic storage container systems and the unused plastic storage container systems are composed of material selected from the group containing high density polyethylene, polypropylene, and polyethylene terephthalate.

\* \* \* \* \*